Figure 4:
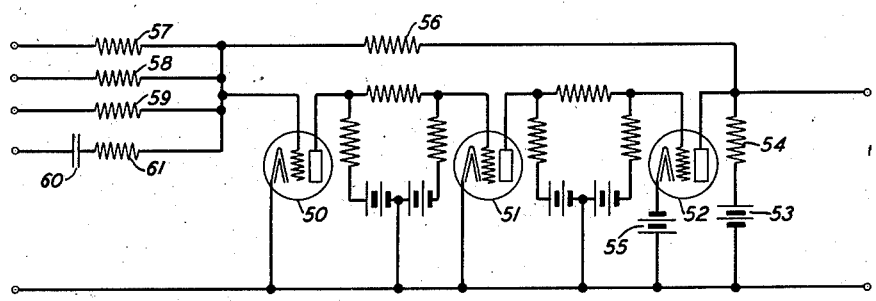

March 23, 1948.                S. DARLINGTON                    2,438,112
                               BOMBSIGHT COMPUTER
                               Filed June 29, 1943              3 Sheets-Sheet 1
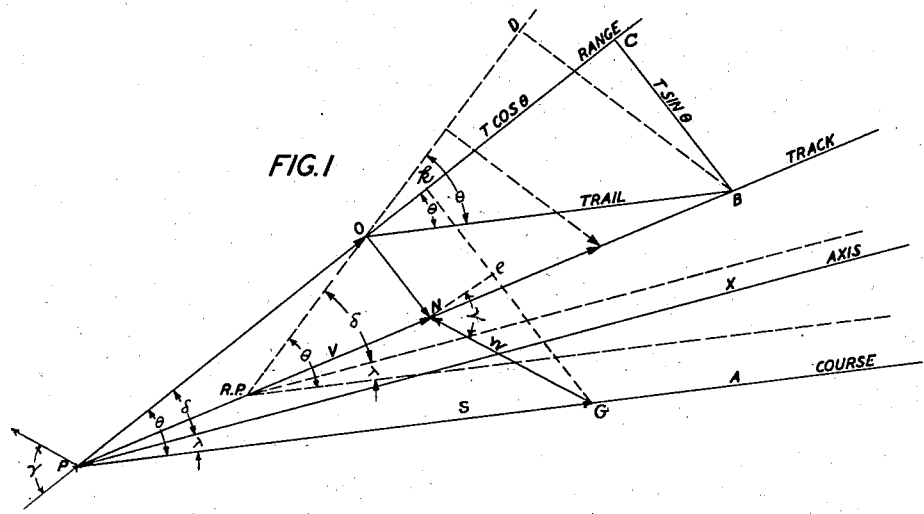
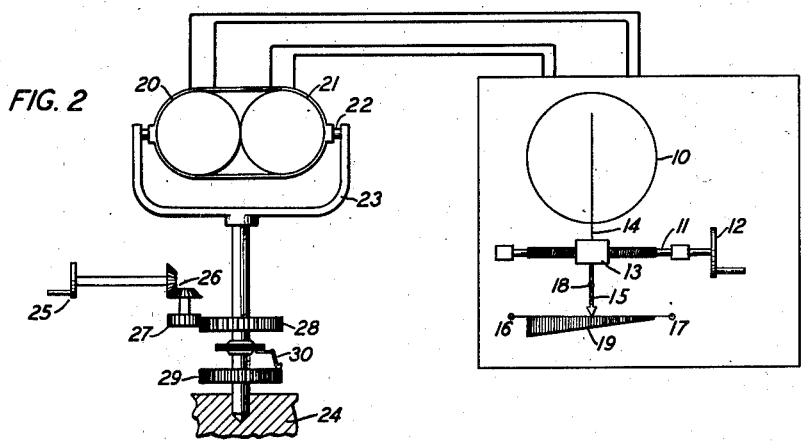
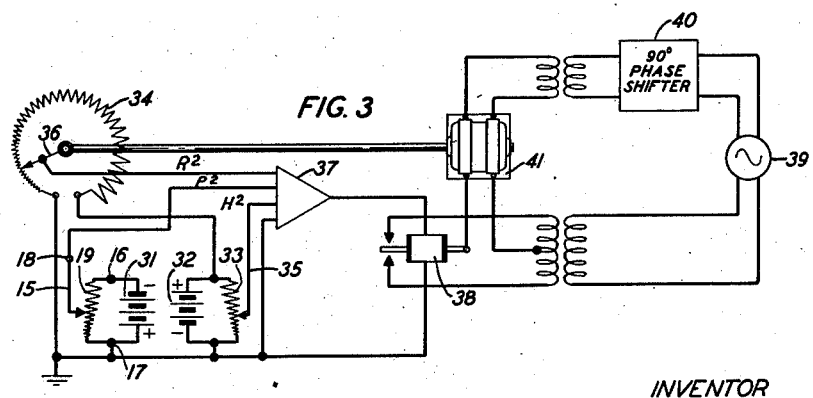
INVENTOR
S. DARLINGTON
BY
ATTORNEY March 23, 1948.　　S. DARLINGTON　　2,438,112
BOMBSIGHT COMPUTER
Filed June 29, 1943　　3 Sheets-Sheet 2

INVENTOR
S. DARLINGTON
BY
ATTORNEY

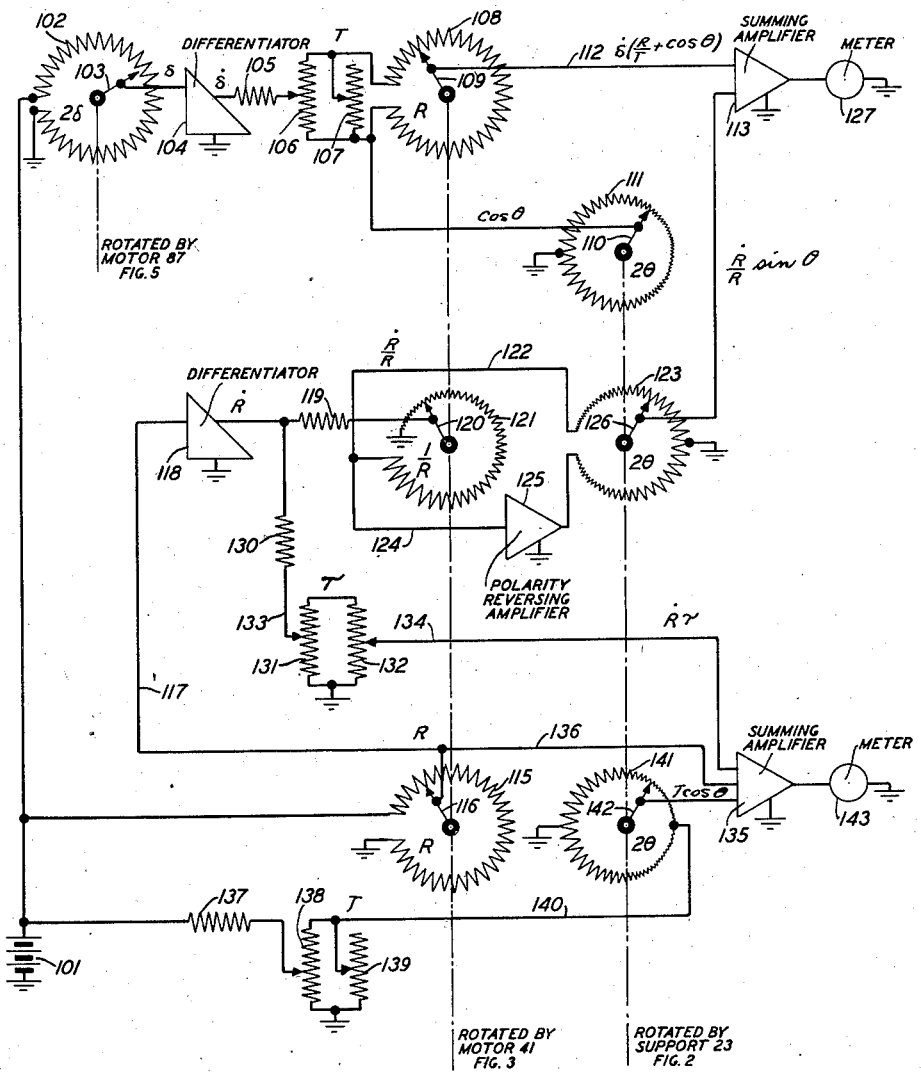

Patented Mar. 23, 1948

2,438,112

UNITED STATES PATENT OFFICE 2,438,112

BOMBSIGHT COMPUTER

Sidney Darlington, New York, N. Y., assignor to Bell Telephone Laboratories, Incorporated, New York, N. Y., a corporation of New York Application June 29, 1943, Serial No. 492,729

6 Claims. (Cl. 235—61.5)

This invention relates to a computer associated with an aerial bombsight, and particularly to a computer in which the data are expressed in the form of electrical quantities.

The object of the invention is a means for indicating that an aerial vehicle is on the course to be flown to the point where a bomb may be released, and for indicating the distance to go to this spot, so that the bomb will fall on a target.

A feature of the invention is a method and means for producing electrical voltages proportional to the horizontal range and horizontal deflection components of the vector velocity of the aerial vehicle with respect to the target.

Another feature of the invention is a means for producing electrical voltages proportional to the horizontal range and deflection components of the total displacement of the aerial vehicle from the moment of observation to the moment of impact.

Another feature of the invention is a means for comparing the ratio of the electrical voltages proportional to the range and deflection components of the vector velocities of the aerial vehicle with the ratio of the electrical voltages proportional to the horizontal range and deflection components of the total displacement of the aerial vehicle from its predicted position at the instant of impact of the bomb, whereby equality of these ratios indicates the correct track to be flown.

A further feature of the invention is a means for deriving an electrical voltage proportional to the horizontal range component of the displacement of the vehicle, and another electrical voltage proportional to the change in the horizontal range component during the time of fall of the bomb, and of comparing these voltages whereby equality of these voltages indicates that the vehicle has reached the position to release the bomb.

The present computer is associated with a sight capable of continuously measuring an azimuth angle and a distance. The azimuth angle is measured from some convenient axis at the aerial vehicle, say the head to tail axis of an airplane, to the vertical plane through the target. The distance is the slant distance from the vehicle or airplane to the target. The bombsight may be a simple optical instrument including a theodolite for measuring the azimuth angle and an optical range finder for measuring the distance, or a radio locating equipment capable of measuring the azimuth angle and slant distance. The range finder may also be used to measure the height or elevation of the aerial vehicle above the surface of the earth. The measurement of height, and the continuous measurements of azimuth angle and slant distance are supplied as voltages to the computer, together with information in the form of voltages representing the ballistic characteristics of the bomb used, and the computer continuously indicates that the correct course is being flown, and that the correct position has been attained to release the bomb to strike the target.

Figure 5:
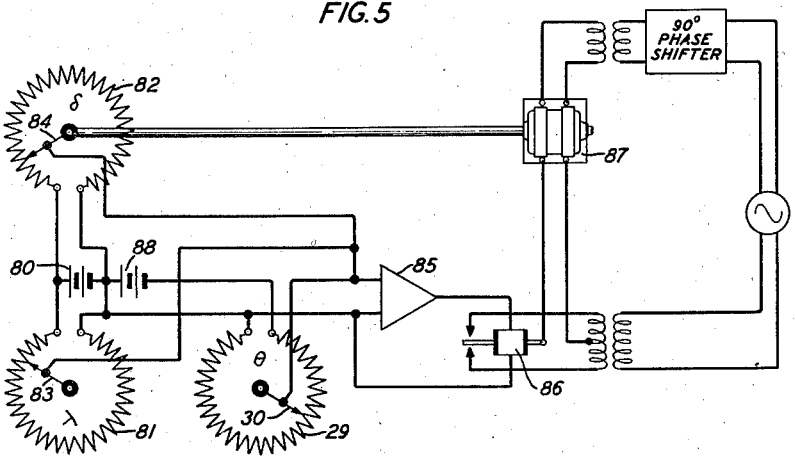

The operation of the computer will be better understood from the drawings in which:

Fig. 1 shows the geometrical relationships involved, projected on a horizontal plane through the aerial vehicle;

Fig. 2 diagrammatically shows a radio locator equipment associated with the computer;

Fig. 3 schematically shows a device for producing a rotation proportional to horizontal range;

Fig. 4 shows a thermionic amplifier forming part of the device;

Fig. 5 schematically shows a device for producing a rotation proportional to the angle $\delta$;

Fig. 6 schematically shows the computing elements of the invention.

As usual in aerial bombing technique, assume that the aerial vehicle is flying at constant speed and at constant height. At the commencement of the bombing run, the constant height of the aerial vehicle above the ground is measured, say by the range finder. From this constant known height of the aerial vehicle, and the constantly measured slant distance to the target, the computer continuously computes the horizontal range from the aerial vehicle to the projection of the target.

In Fig. 1, P represents the aerial vehicle, such as an airplane headed along the course PA. If a wind be blowing, the airplane will continually drift off the course and will actually travel along some track, such as PB. The target is located at O, and the computer is required to continuously indicate whether the vehicle is on the correct track PB, and whether the airplane has reached the release point RP so that a bomb released at this position will fall on the target O.

If the airplane while steadily heading along the course PA at constant speed and height, is driven by the wind to actually travel along the track PB, and, after releasing a bomb at RP, continues at the same speed along the track PB, it will reach the point B at the instant of impact of the bomb on the target. The distance OB, along the head to tail axis of the airplane is known as the "trail"

T, and is tabulated in the ballistic tables for the type of bomb used.

The angle APO between the course of the airplane and the vertical plane through the target is designated $\theta$. If the air structure be standard, the bomb will fall directly behind the airplane, in the plane of the head to tail axis of the airplane, that is, the trail is in the line of the course, so that the angle BOC is equal to the angle APO which is equal to $\theta$. Thus OC, the range component of the trail equals $T \cos \theta$, and BC, the deflection component of the trail equals $T \sin \theta$. The distance $PC = R + T \cos \theta$, may be termed the horizontal range component of the total displacement from P to B of the airplane, and the distance $T \sin \theta$ the deflection component of the total displacement with respect to point P.

The airplane is equipped with a gyroscopic device of known type, such as a device of the type shown in United States Patent 1,959,803, May 22, 1934, B. A. Wittkuhns, which maintains an axis PX, having a fixed direction in space, irrespective of the turning of the airplane. The airplane has a ground speed along the track PB, represented by the vector PN. This vector PN may be resolved into two components PO, the range component of the ground speed and ON, the deflection component of the ground speed. The range component of the ground speed PO is evidently the rate of change in the horizontal range R, and, as the range is decreasing, this component is inherently negative and will be designated $-\dot{R}$, where the dot indicates the time rate of change in the quantity. The deflection component of the ground speed ON is equal to $R\dot{\delta}$, where $\dot{\delta}$ is the time rate of change in the angle $\delta$. (This conversion of vectors is shown, for example, on page 31, Alternating Currents and Transients, F. M. Colebrook, 1925, McGraw-Hill Book Company, 370 Seventh Avenue, New York.)

The angles PON and PCB are right angles making the triangles PON and PCB similar, thus $$\frac{R\dot{\delta}}{-\dot{R}} = \frac{T \sin \theta}{R + T \cos \theta}$$

which may be transformed into $$\dot{\delta}\left(\frac{R}{T} + \cos \theta\right) + \frac{\dot{R}}{R}(\sin \theta) = 0 \quad (1)$$

The angle XPA, between the axis PX, having a fixed direction in space and the course of the airplane PA, is indicated by the gyroscopic device and is designated $\lambda$. The angle XPC, designated $\delta$ is evidently equal to $\theta - \lambda$.

If the airplane is heading along the course PA, and the track of the airplane is a straight line PB, then $\lambda$ will be constant, and $\dot{\delta} = \dot{\theta}$. If the heading of the airplane changes, $\lambda$ and $\theta$ will both change at the same rate, so $\dot{\delta} = \dot{\theta} - \dot{\lambda}$. Even if the airplane leaves the track PB and flies in some curved path, it may be shown that the relationship $\dot{\delta} = \dot{\theta} - \dot{\lambda}$ is still true. Thus, for constant height, no matter what track is made good, Equation 1 is still valid, and indicates that the vehicle is on the correct track to pass through the correct release point for the bomb.

Let the vector PG represent the airspeed S, that is, the speed of the aerial vehicle relative to the air in the direction of the course. Let the vector GN represent the wind velocity W relative to the ground, blowing from G to N at the angle $\gamma$ measured with respect to PO. Draw $Gk$ normal to PC, and $Nl$ normal to $Gk$.

Then $$-\dot{R} = Pk - Ok = Pk - Nl = S \cos \theta - W \cos \gamma$$

$$R\dot{\delta} = Gk - Gl = S \sin \theta - W \sin \gamma$$

When steering on the correct track, $$\frac{R\dot{\delta}}{-\dot{R}} = \frac{T \sin \theta}{R + T \cos \theta} \text{ or } R\dot{\delta}(R + T \cos \theta) - (-\dot{R})T \sin \theta = 0$$

When the heading or track is not correct, this quantity will no longer be zero, thus, let $$E = R\dot{\delta}(R + T \cos \theta) - (-\dot{R})T \sin \theta$$

and substituting $$E = (S \sin \theta - W \sin \gamma)(R + T \cos \theta) -$$
$$(S \cos \theta - W \cos \gamma)T \sin \theta =$$
$$(SR + TW \cos \gamma) \sin \theta - TW \sin \gamma \cos \theta - RW \sin \gamma$$

In this expression, S, T, W and $\gamma$ are constant, $$\frac{T}{R} \text{ and } \frac{W}{S}$$

are both less than unity, and are usually quite small. If the vehicle is at point P, and the only error is in the heading, then R will be correct. Even if the vehicle is not on the correct track, the value of R will be substantially unchanged. Thus, only the angle $\theta$ depends upon the instantaneous heading of the vehicle. It may be shown that E varies substantially linearly with $\theta$, when $\theta$ has values from $-90$ degrees to $+90$ degrees. Thus, a circuit designed to compute in accordance with Equation 1 will produce a voltage which in magnitude and polarity is always proportional to the error in the heading of the vehicle.

If an electrical voltage, varying in proportion to Equation 1 be produced, and supplied to a meter, the meter needle will be in the center of the scale when the airplane is on the correct track; when the airplane is to the right of the correct track, the needle will be to the left of the center of the scale; when the airplane is to the left of the correct track, the needle will be to the right of the center of the scale, the meter thus indicating in which direction the airplane should be turned in order to fly back on to the correct track.

The dotted lines in Fig. 1 show the condition as the airplane passes through the correct release point RP. The angle $\theta$, between the course and the range line has increased in magnitude causing a corresponding increase in the angle $\delta$, the angle $\lambda$ remaining unchanged. After releasing a bomb at the point RP, the total displacement of the airplane during the time between the releasing of the bomb and its impact on the target will be the distance RPB. The horizontal range component of this total displacement is RPD, and this distance is evidently equal to the distance RPO, which is the horizontal range R, plus the distance OD which is equal to $T \cos \theta$. The rate of change in the horizontal range is $-\dot{R}$, thus the total change in the horizontal range during the time of fall of the bomb is evidently $-\dot{R}t$, where $t$ equals the time of fall of the bomb. The horizontal range component of the total displacement of the airplane during the time of fall of the bomb is evidently equal to the total increment in the horizontal range component during the same time, thus $$R + T \cos \theta = -\dot{R}t \text{ or } R + T \cos \theta + \dot{R}t = 0 \quad (2)$$

Thus, if an electrical voltage varying in proportion to Equation 2 is produced, this voltage will pass through zero at the proper point or range to release the bomb in order to strike the target.

Thus, in approaching the target, the pilot may fly on any course at constant height which he considers advisable. The steering meter, actuated in accordance with Equation 1 will indicate the direction of turn to bring the airplane to the correct track, and the deflection of the release meter, actuated in accordance with Equation 2, will indicate the approach to the release point. A convenient time before the release meter reads zero, the pilot steers the airplane to bring and hold the steering meter at zero, so that the airplane will be on the correct track when the release meter passes through zero, that is, when the airplane passes through the release point.

The present computer responds to a voltage proportional to the slant distance from the airplane to the target, and a voltage proportional to the azimuth angle $\theta$ from the head to tail axis of the airplane to the vertical plane through the airplane and the target. Many known devices may be adapted to supply these voltages. For example, a potentiometer may be mounted on an optical range finder, and the wiper of the potentiometer moved in accordance with the movement of the range indicator to select a voltage proportional to the slant distance measured by the range finder. A second potentiometer may be mounted concentrically with the vertical axis of a theodolite sighted on the target, and the wiper of this potentiometer moved in accordance with the rotation of the theodolite to select a voltage proportional to the angle turned by the theodolite. Or, as shown in Fig. 2, a radio locator of any suitable type, such as the radio locator shown in British Patent 535,120 accepted March 28, 1941, Compagnie Generale de Telegraphie sans Fil, may be adapted to supply these voltages. In this particular locator, the range is indicated by the location of a bright spot on the surface of the screen of a cathode ray oscilloscope 10. A worm shaft 11, rotated by a handwheel 12, or by a suitable motor, may be journaled in suitable bearings on the locator, to drive a nut 13 carrying a pointer 14 which is thus kept aligned with the bright spot on the screen of the oscilloscope. The winding 19 of a potentiometer may be mounted below the worm shaft 11, the wiper 15 of the potentiometer being moved by, but insulated from, the nut 13. A suitable source of voltage may be connected to the terminals 16 and 17 of the winding of the potentiometer, and the wiper 15 may be led out to a terminal 18. The antennas and reflectors 20, 21 of the radio locator may be supported by a framework mounted on a shaft 22 journaled in a support 23 rotatably mounted in a base 24. The handwheel 25, bevel gear 26 and gear 27 drive the gear 28 locating the antennas in azimuth. A potentiometer winding 29 may be mounted upon, but insulated from, the base 24 and connected to suitable terminals. A wiper 30 may be mounted upon the support 23, but insulated therefrom and connected to a suitable terminal. The voltage selected by the wiper 30 will then be proportional to the azimuth angle. While, for the sake of explanation, one specific type of locator has been illustrated, it is evident that the present invention is not limited to the use of this particular device, but will operate with many optical, mechanical, radio, sonic, and other devices.

The potentiometer winding 19, shown in Fig. 3, is the same potentiometer winding as shown mounted upon the radio locator in Fig. 2. Voltage of one polarity from a battery 31, or other suitable source, is supplied to the terminals 16 and 17 of the potentiometer winding 19. Voltage of the opposite polarity is supplied by the source 32 to two other potentiometer windings 33 and 34. The resistances of the potentiometer windings 19, 33, 34 are tapered so that the voltages selected by the wipers 15, 35, 36 will be proportional to the square of the displacement of the wipers.

The potentiometer windings 19, 33 and 34 may conveniently be formed of a single layer of resistance wire wound smoothly and closely upon a thin card or sheet of insulating material, such as phenol fiber, having one straight edge, the width of the potentiometer card varying in such manner as to produce the desired variation in the voltage selected by the wipers. Let $w(x)$ equal the width of the potentiometer card at some displacement $x$ expressed as a fraction of the length of the card, $n$ equal the number of turns of wire per unit length of the card, $r$ equal the resistance per unit length of the wire, $r_x$ equal the resistance of the potentiometer card from the beginning to the displacement $x$, $r_m$ equal the maximum resistance of the whole potentiometer card, then the resistance per unit length of the potentiometer card will equal $2w(x)nr$. At the displacement $x$, $$r_x = \int_0^x 2nr w(x) dx$$

$$w(x) = \frac{1}{2nr} \cdot \frac{dr_x}{dx}$$

But if the voltage selected by the wiper is to be proportional to the square of the displacement of the wiper then $r_x$ must be equal to $r_m x^2$. Thus $$w(x) = \frac{1}{2nr} \cdot \frac{d(r_m x^2)}{dx} = \frac{r_m}{nr} x$$

The potentiometer cards for the windings 19, 33 and 34 thus should be triangular in shape, the width of the potentiometer card varying with the displacement of the wiper from the beginning of the winding.

If the voltage selected by the wiper of a potentiometer is to vary in accordance with sin $x$, where the displacement of the wiper is proportional to some variable angle $x$, then $$w(x) = \frac{1}{2nr} \cdot \frac{d(r_m \sin x)}{dx} = \frac{r_m}{2nr} \cdot \cos x$$

Similarly, if the voltage selected by the wiper is to vary with cos $x$, then $$w(x) = \frac{r_m}{2nr} \cdot \sin x$$

These relationships are only rigorously true if no current is drawn from the potentiometer winding by the wiper. If current is supplied by the winding to some load connected to the wiper, the shape of the card should be appropriately modified to correct for the effect of the current drawn.

The height H of the airplane and the horizontal range R are the sides of a right triangle, of which the slant range $\rho$ is the hypotenuse. Thus $H^2 + R^2$ should equal $\rho^2$ or, $H^2 + R^2 - \rho^2$ should equal 0.

The wiper 35 is adjusted to the predetermined height H of the airplane, and the wiper 15 is continuously adjusted to have a displacement proportional to the slant range $\rho$. The voltage selected by the wiper 36 is approximately equal to the square of the horizontal range. The voltage selected by the wiper 15 is of opposite polarity to the voltages selected by the wipers 35 and 36. The voltages selected by the wiper 35, which is equal to $+H^2$, the voltage selected by the wiper 36 which is approximately equal to $+R^2$ and the voltage from the wiper 15 which is equal to $-\rho^2$, are respectively supplied to a summing amplifier 37 which may be of the type shown in Fig. 4.

The winding of a relay 37 is connected in the output circuit of the summing amplifier 37. The relay 38 is a polar relay, normally biased to a central position, and operated in one direction or the other depending upon the polarity of the voltage in the output circuit of the amplifier 37. If the voltages summed up by the amplifier 37 are not equal to zero, the relay 38 will be operated in one direction or the other.

Current is supplied from a suitable source 39, through a 90-degree phase shifting network 40 to one winding of a two-phase motor 41, which rotates the wiper 36 either directly or through suitable gearing, flexible shafting or other mechanism. Current may also be supplied from the source 39 to the other winding of the motor 41, the supply of current to this winding and the phase of the current supplied being controlled by the position of the armature of relay 38. Thus if the voltage in the output of the amplifier 37 is not equal to zero, the relay 38 will be operated, starting the motor 41 and rotating the wiper 36 in such a direction as to reduce the voltage in the output of the amplifier 37 to zero, releasing the relay 38. When the voltage in the output of the amplifier 37 is equal to zero, $H^2+R^2-\rho^2=0$, and the displacement of the wiper 36 indicates the value of R, the horizontal range. Other potentiometers may be mounted so that their wipers will also be rotated by the shaft of the motor 41, an amount proportional to R, the horizontal range.

The summing amplifier 37, shown in Fig. 3, may conveniently be of the type shown in Fig. 4, including three thermionic amplifying devices 50, 51 and 52 connected in cascade. The interstage coupling networks may be of any type suitable for the frequency range to be covered, thus, working with low frequencies, the interstage coupling networks may conveniently be, as shown, of the type disclosed in United States Patent 1,751,527, March 25, 1930, H. Nyquist. The amplifying devices 50, 51 and 52 have been shown as simple triodes but, if higher voltage gain is desired, other known devices, such as suppressor grid pentodes, may be used. The input circuit of the triode 50 should be arranged so that in the absence of an applied signal, the control grid is at ground potential.

Current from a suitable source 53 is supplied through the coupling resistor 54 to the anode of the output triode 52. In the absence of a signal applied to the amplifier, the anode current of the output triode 52 is adjusted so that the voltage of the source 53 is wholly consumed in the resistor 54, thus the anode of the triode 52 is at ground potential and no voltage is supplied to the output circuit. A source of voltage 55, having its negative pole connected to the cathode of the output triode 52 and its positive pole connected to ground, maintains the anode current flowing in the triode 52.

A large degree of negative or reverse feedback is supplied through the resistor 56 from the anode of the output triode 52 to the control grid of the first triode 50. The voltages selected by the wipers 15, 35 and 36, Fig. 3, are respectively supplied through the resistors 57, 58 and 59 to the control grid of the first triode 50. The effect of the large degree of negative or reverse feedback supplied through the resistor 56 is to make the input impedance of the first triode 50 have a very low value, thus the movements of the wipers 15, 35 and 36 do not cause any interactions among the voltages selected. Another effect of the large degree of negative or reverse feedback is to make the voltage amplification of the complete amplifier, for any input, substantially independent of the voltage amplification factors of the triodes 50, 51 and 52 and dependent almost entirely upon the ratio of the resistance of the feedback resistor 56 to the resistance of the resistor in series with the particular source. Thus, when the summing repeater of Fig. 4 is used in connection with the system of Fig. 3, the input resistors 57, 58 and 59 should be made of equal value, and the resistance of the resistor 56 adjusted with respect to the resistance of an input resistor so as to give the voltage gain necessary to secure correct operation of the relay 38, Fig. 3.

If a negative voltage is applied to the control grid of the device 50, an amplified negative voltage will be applied to the control grid of the device 52, decreasing the anode current of the device 52, reducing the voltage drop in the resistor 54 and causing a positive voltage to appear across the output circuit. The amplifier shown in Fig. 4 thus reverses the polarity of the voltage applied to the input circuit. If a plurality of voltages be applied to the input circuit, the voltage across the output circuit will be proportional to the sum of the applied voltages. If a voltage be applied through a capacitor 60 and resistor 61 in serial relationship to the input circuit of the summing amplifier, the output voltage of the summing amplifier will contain a component proportional to the derivative or time rate of change of the voltage applied through the capacitor 60.

Fig. 5 discloses a system similar to the system shown in Fig. 3 which will produce a rotation of a shaft proportional to the angle $\delta$, Fig. 1. As aforesaid, the angle $\delta$ is equal to the angle $\theta$ minus the angle $\lambda$. A voltage source 88 of one polarity is connected to the potentiometer winding 29 shown in Fig. 2. The wiper 30 of this potentiometer is moved by the tracking of the antenna structure through an angle proportional to the azimuth angle $\theta$. Another voltage source 80, of opposite polarity to the source 88 is connected across the windings of two other potentiometers 81 and 82. The wiper 83 is moved by the servomotor associated with the gyroscopic device maintaining the axis PX, shown in Fig. 1, through an angle proportional to the angle $\lambda$. The voltages selected by the wipers 30, 83 and 84 are respectively supplied through the input resistors of the summing amplifier 85 of the type shown in Fig. 4. The voltage selected by the wiper 83 is proportional to $+\lambda$, the voltage selected by the wiper 30 is proportional to $-\theta$, and the voltage selected by the wiper 84 is approximately proportional to $+(\theta-\lambda)$, thus the voltages supplied to the input of the summing amplifier 85 are equal to $\lambda-\theta+(\theta-\lambda)$ and should equal zero. If the sum of these voltages is not equal to zero, the relay 86 will be operated, starting the motor 87 which rotates the wiper 84 until the sum of the voltages is reduced to zero. The displacement of the wiper 84 is then proportional to the angle δ.

Thus, from the antenna support 23 of Fig. 2 there is a movement proportional to the angle θ, Fig. 1; from the servomotor of the gyroscopic device maintaining the fixed axis there is a movement proportional to the angle λ, Fig. 1; from the shaft of the motor 87, Fig. 5, there is a movement proportional to the angle δ, Fig. 1; and from the shaft of the motor 41, Fig. 3, there is a movement proportional to the horizontal range R, Fig. 1. Obviously, more than one potentiometer winding may be associated with each of these devices, so that all of the wipers of the group of potentiometers will be moved proportionately to the particular movement.

In Fig. 6, voltage from a battery 101, or other suitable source, is applied to one end of a potentiometer winding 102, the other end being grounded. The potentiometer winding 102 has a uniform resistance per unit length. The wiper 103 is rotated by the shaft of the motor 87, Fig. 5. From Fig. 1, it is evident that the angle δ cannot exceed 90 degrees to the left of the $x$ axis and 90 degrees to the right of the $x$ axis, a total variation of 180 degrees. As the potentiometer winding 102 may conveniently occupy the full circumference of a complete circle, in order to secure a more advantageous scale factor for the voltage selected by the wiper 103, the wiper 103 may conveniently be arranged to rotate throughout the complete circle, thus the wiper 103 is driven through gearing, or other convenient mechanism, so as to rotate through twice the angle of rotation of the shaft of the motor 87, Fig. 5. The voltage selected by the wiper 103 is supplied to the capacitor 60 of an amplifier 104 per Fig. 4, which then operates as a differentiator and develops a voltage across the output circuit proportional to the derivative or time rate of change of the applied voltage, that is, to δ̇. The voltage from the output of the differentiator 104 is supplied, through a decoupling resistor 105, to the wiper of a potentiometer 106.

The potentiometer 102 and differentiator 104 form a convenient and accurate means of obtaining a voltage proportional to the rate of change in the angle δ but other means, such as a tachometer or small generator driven by the shaft of the motor 87, Fig. 5, may be used if desired.

It is known that the trail of a bomb is a function of the vertical height from which the bomb is dropped, and the air speed of the airplane from which the bomb is dropped. The height H of the airplane is determined at the beginning of the bombing run. The air speed S of the plane is determined by the usual air speed meter. The values of the trail for selected values of the height and air speed of the airplane are tabulated in the firing tables for the bomb to be used, or may be determined by experiment. The winding of the potentiometer 106 is shunted by a variable resistor 107, the windings of the potentiometer 106 and the resistor 107 being designed as described in column 6 to have a variation in resistance in accordance with the functional relationship between the trail and the height and air speed of the airplane. The wiper of the potentiometer 106 is adjusted to the measured height of the airplane, and the wiper of the rheostat 107 is adjusted to the measured air speed of the airplane. A potentiometer winding 108, having a uniform resistance per unit length, is connected across the winding of the potentiometer 106. The wiper 109 is rotated by the shaft of motor 41, Fig. 3, a distance proportional to the horizontal range R to the target. The lower end of the winding of the potentiometer 106 is connected to the wiper 110 of a rheostat 111. From Fig. 1, it is evident that the angle θ, like the angle δ, has a variation of 90 degrees on each side of the $x$ axis. The wiper 110 is rotated, through gearing or other mechanism, by the support 23, Fig. 2, through an angle which is double the angle θ. The winding of the rheostat 111 has a resistance per unit length varying with a sinusoidal function, thus the movement of the wiper 110 inserts in the circuit a resistance proportional to cos θ. As the voltage applied to the wiper of the potentiometer 106 is proportional to δ̇, the voltage supplied to the connection 112 will be proportional to $$\dot{\delta}\left(\frac{R}{T}+\cos\theta\right)$$

This voltage is supplied to one of the input resistors of the summing amplifier 113, which may be of the type of summing amplifier disclosed in Fig. 4.

Voltage from the source 101 is also supplied to the potentiometer winding 115, having a uniform variation in resistance. The wiper 116 is moved by the shaft of the motor 41, Fig. 3, to select a voltage proportional to the horizontal range R to the target. The voltage selected by the wiper 116 is supplied by the connection 117 to the capacitor 60 in the input of a differentiator 118, which may be of the type shown in Fig. 4. The output voltage of the differentiator 118 will thus be proportional to Ṙ, the rate of change in horizontal range. If desired, the potentiometer 115 and differentiator 118 may be replaced by a tachometer or generator driven by the shaft of the motor 41, Fig. 3. The output voltage of the differentiator 118 is supplied through resistor 119 to the wiper 120 of a variable rheostat 121. The winding of the rheostat 121 has a resistance per unit length such as to give a potentiometer factor proportional to 1/R. The lower end of the winding of the rheostat 121 is connected by connection 122 to one end of the potentiometer winding 123. The lower end of the rheostat winding 121 is also connected by connection 124 to the input resistor of the polarity reversing amplifier 125 which may be of the type shown in Fig. 4. The output of the polarity reversing amplifier 125 is applied to the other end of the potentiometer winding 123. The mid-point of the potentiometer winding 123 is grounded. The potentiometer winding 123 varies in resistance per unit length in accordance with a cosinusoidal function. The wiper 126, like the wiper 110, is rotated by the support 23, Fig. 2, through an angle 2θ. The voltage selected by the wiper 126 will thus be proportional to $$\frac{\dot{R}}{R}\sin\theta$$

and this voltage is supplied through an individual input resistor to the summing amplifier 113.

The output voltage of the summing amplifier 113 will thus be proportional to $$\dot{\delta}\left(\frac{R}{T}+\cos\theta\right)+\frac{\dot{R}}{R}\sin\theta$$

and, as shown hereinabove, this voltage will be zero when the airplane is flying on the correct track. The output voltage of the summing amplifier 113 is supplied to a meter 127, and the needle of the meter 127 may be arranged to be in the center of the scale when the voltage applied to the summing amplifier 113 is zero, and to deflect to one side or the other of the center of the scale to indicate when the airplane is flying on one side or the other of the correct course.

A portion of the output voltage of the differentiator 118 is supplied through decoupling resistor 130 to the wiper of a potentiometer 131, the winding of potentiometer 131 being connected in parallel with the winding of a second potentiometer 132. It is known that the time of fall $t$ of a bomb is a function of the height of the airplane and of the air speed of the airplane and the values of the time of fall for selected values of the height and air speed of the airplane are tabulated in the firing tables for the bomb to be used. The potentiometer winding 131 is designed as described in column 6 to have a resistance varying in accordance with the functional variations of the time of fall of the bomb with the height of the airplane, and the potentiometer winding 132 is designed as described in column 6 to have a resistance varying in accordance with the functional variation of the time of fall of the bomb with the air speed of the plane. The wiper 133 is adjusted to the measured height of the plane, and the wiper 134 is adjusted to the measured air speed of the plane. The voltage selected by the wiper 134, which thus varies in accordance with R$t$ is supplied to an input resistor of the summing amplifier 135, which may be of the type shown in Fig. 4.

The voltage selected by the wiper 116, proportional to R, is supplied by the connection 136 to an individual input resistor of the summing amplifier 135.

The voltage from the source 101 is supplied through the decoupling resistor 137 to the wiper of potentiometer 138. The potentiometer winding 138 is shunted by the variable rheostat 139. The wiper of potentiometer 138 is adjusted to the known height of the airplane, and the wiper of the rheostat 139 is adjusted to the known air speed of the airplane, thus the potentiometer 138 and rheostat 139, like the potentiometer 106 and rheostat 107, produce a voltage on the connection 140 proportional to the trail T of the bomb. This voltage is applied to one diametrical point of a potentiometer winding 141 having a resistance per unit length varying in accordance with a sinusoidal function. The other diametrical point of the winding is grounded. The wiper 142, like the wipers 110 and 126, is rotated by the support 23, Fig. 2, through an angle $2\theta$, thus the voltage selected by the wiper 142 is proportional to T cos $\theta$, and this voltage is supplied through an individual input resistor to the summing amplifier 135.

The output voltage of the summing amplifier 135 will thus be proportional to $R+T \cos \theta + Rt$, and this voltage will drop to zero when the correct point for releasing the bomb has been reached.

The output voltage of the summing amplifier 135 may be applied to a meter 143, thus when the meter 143 falls to zero the bomb should be released. If desired, the meter 143 may be replaced by any suitable electromechanical mechanism which will automatically release the bomb when the current falls to zero.

If desired, the wipers of the potentiometers 106, 131 and 138 may be ganged to move together when setting in the measured height of the airplane, and similarly, the wipers of rheostats 107, 139 and potentiometer 132 may be ganged to move together when setting in the measured airspeed of the airplane.

What is claimed is:

1. In a system for indicating that the correct track is being flown by an aerial vehicle so that a bomb dropped from said vehicle will land on a target, a grounded source of voltage, means connected to said source and controlled by observations of said target to fractionate the voltage from said source proportionally to the rate of change in the angle between a fixed direction and the vertical plane including said vehicle and said target, a first potentiometer having a first wiper connected to said means and adjusted to select a voltage proportional to the trail of said bomb, and a winding, means on said vehicle controlled by observations of said target including a first shaft moved proportionally to the horizontal range from said vehicle to said target and a second shaft moved proportionally to the angle between the axis of said vehicle and said plane, a second potentiometer having a second wiper connected to the winding of said first potentiometer and moved by said second shaft and a winding varying in resistance with a sinusoidal function connected to ground, and a third potentiometer having a winding connected across the winding of said first potentiometer and a third wiper moved by said first shaft to select a voltage proportional to said rate of change multiplied by the ratio of said range to said trail plus the cosine of said latter angle.

2. In a system for indicating the point at which a bomb may be released from an aerial vehicle to strike a target, a source of voltage, first means connected to said source and controlled by observations of said target to fractionate the voltage from said source proportionally to the horizontal component of the distance from said vehicle to said target, electronic means connected to said first means to produce a voltage proportional to the component of the ground speed of said vehicle in the direction of said target, second means connected to said electronic means and adjusted to fractionate the voltage from said means proportionately to the time of fall of said bomb, third means connected to said source and adjusted to fractionate the voltage from said source proportionately to the trail of said bomb, fourth means connected to said third means and controlled by observations of said target to further fractionate the voltage from said source proportionally to the cosine of the azimuthal angle between the course of said vehicle and the vertical plane through said vehicle and said target, a feedback amplifier having an input circuit connected to said first, second and fourth means to add the voltages from said means, and an output circuit, and a meter connected to said output circuit to indicate the sum of said voltages.

3. In a system for indicating the point at which a bomb may be released from an aerial vehicle to strike a target, a source of voltage, first means connected to said source and controlled by observations of said target to fractionate said voltage proportionally to the horizontal range from said vehicle to said target, second means connected to said source and controlled by observations of said target to fractionate said voltage proportionally to the horizontal range component of the trail of said bomb, differentiating means connected to said first means to produce a voltage proportional to the time rate of change of said first fractionated voltage, the third means connected to said differentiating means and adjusted to fractionate the voltage from said means proportionately to the time of fall of said bomb, electronic means having an input circuit connected to said first, second and third means to add the voltages from said means, and an output circuit, and a meter connected to said output circuit to indicate when the sum of said voltages falls to zero.

4. In a system for indicating the course to be flown by a bomber to drop a bomb on a target, mechanism controlled in accordance with observations of the target to rotate a first shaft proportionally to the azimuth angle of the target and a second shaft proportionally to the horizontal range to the target, first means controlled by said first shaft to form the source of a first voltage proportional to the angular velocity of said shaft, second means controlled by said second shaft to form the source of a second voltage proportional to the rate of change of horizontal range, first potentiometer means connected to the source of said first voltage and adjusted to fractionate said voltage inversely proportionally to the trail of said bomb, second potentiometer means connected to said first potentiometer means and controlled by said second shaft to further fractionate said voltage proportionally to the horizontal range, third potentiometer means connected to the source of said first voltage and controlled by said first shaft to fractionate said voltage proportionally to the cosine of said azimuth angle, fourth potentiometer means connected to the source of said second voltage and controlled by said second shaft to fractionate said voltage inversely proportionally to said range, fifth potentiometer means connected to said fourth potentiometer means and controlled by said first shaft to further fractionate said latter voltage proportionally to the sine of said azimuth angle, and means connected to said second, third and fifth potentiometer means to oppose the voltages from the second and third means to the voltage from the fifth means and indicate the difference, whereby said indication varies in direction and magnitude with the sense and extent of the deviation of the course of the bomber from the correct course.

5. In a system for indicating the course to be flown by a bomber to drop a bomb on a target, mechanism controlled in accordance with observations of the target to rotate a first shaft proportionally to the angle between an axis fixed in direction and the vertical plane containing the bomber and the target, to rotate a second shaft proportionally to the angle between the axis of the bomber and said plane, and to rotate a third shaft proportionally to the horizontal range to the target, first means controlled by said first shaft to form the source of a first voltage proportional to the angular velocity of said shaft, second means connected to the source of said first voltage and adjusted to fractionate said voltage inversely proportionally to the trail of the bomb, third means connected to said second means and controlled by said third shaft to further fractionate said voltage proportionally to the horizontal range, fourth means connected to the source of said first voltage and controlled by said second shaft to fractionate the first voltage proportionally to the cosine of the angle of rotation of said shaft, fifth means controlled by said third shaft to form the source of a second voltage proportional to the angular velocity of said third shaft, sixth means connected to the source of said second voltage and controlled by said third shaft to fractionate said second voltage inversely proportionally to the horizontal range, seventh means connected to said sixth means and controlled by said second shaft to fractionate the voltage proportionally to the sine of the angle of rotation of said second shaft, and meter means connected to said third, fourth and seventh means to oppose the voltages from said third and fourth means to the voltage from said seventh means and indicate the difference, whereby said indication varies in direction and magnitude with the sense and extent of the deviation of the course of the bomber from the correct course.

6. In a system for indicating the course to be flown by a bomber and the distance to go to drop a bomb on a target, mechanism controlled in accordance with observations of the target to rotate a first shaft proportionally to the angle between an axis fixed in direction and the vertical plane containing the bomber and target, to rotate a second shaft proportionally to the angle between the axis of the bomber and said plane, and to rotate a third shaft proportionally to the horizontal range to the target, means controlled by said first shaft to form the source of a first voltage proportional to the angular velocity of the first shaft, means controlled by said third shaft to form the source of a second voltage proportional to the displacement of the third shaft and the source of a third voltage proportional to the angular velocity of the third shaft, first potentiometer means connected to the source of said first voltage and adjusted to select a voltage inversely proportional to the trail of the bomb, second potentiometer means connected to said first potentiometer means and controlled by said third shaft to select a voltage proportional to the horizontal range, third potentiometer means connected to the source of said first voltage and controlled by said second shaft to select a voltage proportional to the cosine of the angle of rotation of the second shaft, fourth potentiometer means connected to the source of said third voltage and controlled by said third shaft to select a voltage inversely proportional to the horizontal range, fifth potentiometer means connected to said fourth means and controlled by said second shaft to select a voltage proportional to the sine of the angle of rotation of said second shaft, first meter means connected to said second, third and fifth potentiometer means to oppose the voltages from the second and third means to the voltage from the fifth means and indicate the difference, whereby said indication varies in direction and magnitude with the sense and extent of the deviation of the course of the bomber from the correct course, sixth potentiometer means connected to the source of said third voltage and adjusted to select a voltage proportional to the time of fall of the bomb, a source of a fourth voltage adjusted to be proportional to the trail of the bomb, seventh potentiometer means connected to the source of the fourth voltage and controlled by the second shaft to select a voltage proportional to the cosine of the angle of rotation of the second shaft and second meter means connected to said sixth and seventh means and the source of said second voltage to oppose the voltage of said sixth means to the other voltages and indicate the difference, whereby said indication is proportional to the distance to go to the correct spot to drop the bomb.

SIDNEY DARLINGTON.

(References on following page)

REFERENCES CITED

The following references are of record in the file of this patent:

UNITED STATES PATENTS

| Number | Name | Date |
|---|---|---|
| 2,105,147 | Inglis | Jan. 11, 1938 |
| 2,162,699 | Chafee et al. | June 20, 1939 |
| 2,297,448 | Baroni | Sept. 29, 1942 |
| 1,542,534 | Schneider | June 16, 1925 |
| 2,134,901 | Wey | Nov. 1, 1938 |
| 1,584,182 | Methlin | May 11, 1936 |
| 2,113,436 | Williams | Apr. 5, 1938 |
| 2,244,369 | Martin | June 3, 1941 |
| 2,407,325 | Parkinson | Sept. 10, 1946 |